(12) United States Patent
Coucheiro Limeres et al.

(10) Patent No.: US 12,223,953 B2
(45) Date of Patent: Feb. 11, 2025

(54) END-TO-END AUTOMATIC SPEECH RECOGNITION SYSTEM FOR BOTH CONVERSATIONAL AND COMMAND-AND-CONTROL SPEECH

(71) Applicant: NUANCE COMMUNICATIONS, INC., Burlington, MA (US)

(72) Inventors: Alejandro Coucheiro Limeres, Aachen (DE); Junho Park, Bedford, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 335 days.

(21) Appl. No.: 17/737,587

(22) Filed: May 5, 2022

(65) Prior Publication Data

US 2023/0360646 A1 Nov. 9, 2023

(51) Int. Cl.
*G10L 15/197* (2013.01)
*G10L 15/16* (2006.01)
*G10L 15/30* (2013.01)

(52) U.S. Cl.
CPC ............ *G10L 15/197* (2013.01); *G10L 15/16* (2013.01); *G10L 15/30* (2013.01)

(58) Field of Classification Search
USPC ..................................... 704/235, 231, 1–504
See application file for complete search history.

(56) References Cited

U.S. PATENT DOCUMENTS 9,129,013 B2 * 9/2015 Delaney .................. G06F 40/30
9,135,571 B2 * 9/2015 Delaney ................ G06F 16/367
9,495,956 B2 * 11/2016 Meisel ..................... G06F 3/167
9,619,572 B2 * 4/2017 Phillips ................... G10L 15/26
(Continued)

FOREIGN PATENT DOCUMENTS

CN 113692616 A * 11/2021 ............... G06N 3/04
EP 4068279 A1 * 10/2022 ............... G06N 3/04
(Continued)

OTHER PUBLICATIONS

Chang, et al., "Context-Aware Transformer Transducer for Speech Recognition", In Proceedings of IEEE Automatic Speech Recognition And Understanding Workshop (ASRU),, Dec. 13, 2021, pp. 503-510.
(Continued)

*Primary Examiner* — Marcus T Riley
(74) *Attorney, Agent, or Firm* — Barta Jones, PLLC

(57) ABSTRACT

A contextual end-to-end automatic speech recognition (ASR) system includes: an audio encoder configured to process input audio signal to produce as output encoded audio signal; a bias encoder configured to produce as output at least one bias entry corresponding to a word to bias for recognition by the ASR system; a transcription token probability prediction network configured to produce as output a probability of a selected transcription token, based at least in part on the output of the bias encoder and the output of the audio encoder; a first attention mechanism configured to receive the at least one bias entry and determine whether the at least one bias entry is suitable to be transcribed at a specific moment of an ongoing transcription; and a second attention mechanism configured to produce prefix penalties for restricting the first attention mechanism to only entries fitting a current transcription context.

20 Claims, 4 Drawing Sheets

(56) References Cited

U.S. PATENT DOCUMENTS

| | | | |
|---|---|---|---|
| 10,366,158 B2 * | 7/2019 | Bellegarda | G06N 3/02 |
| 10,593,346 B2 * | 3/2020 | Van Gysel | G10L 15/183 |
| 11,132,992 B2 * | 9/2021 | Stoimenov | G06N 3/084 |
| 11,158,305 B2 * | 10/2021 | Shahid | G10L 15/08 |
| 11,183,300 B2 * | 11/2021 | Sadeghi | G16H 50/20 |
| 11,238,845 B2 * | 2/2022 | Chen | G10L 15/063 |
| 11,295,739 B2 * | 4/2022 | Li | G10L 15/22 |
| 11,315,548 B1 * | 4/2022 | Heikinheimo | G10L 15/065 |
| 11,475,898 B2 * | 10/2022 | Delfarah | G10L 17/02 |
| 11,657,799 B2 * | 5/2023 | Zhao | G06N 3/044 |
| | | | 704/232 |
| 11,798,535 B2 * | 10/2023 | Stoimenov | G06N 3/045 |
| 11,900,915 B2 * | 2/2024 | Chen | G10L 15/07 |
| 11,948,570 B2 * | 4/2024 | Li | G10L 15/22 |
| 2014/0279729 A1 * | 9/2014 | Delaney | G06F 16/367 |
| | | | 706/12 |
| 2014/0280353 A1 * | 9/2014 | Delaney | G16H 10/60 |
| | | | 707/794 |
| 2014/0365232 A1 * | 12/2014 | Sadeghi | G16H 50/20 |
| | | | 705/2 |
| 2014/0365239 A1 * | 12/2014 | Sadeghi | G16H 50/20 |
| | | | 705/3 |
| 2020/0160836 A1 * | 5/2020 | Chen | G10L 15/16 |
| 2020/0349925 A1 * | 11/2020 | Shahid | G10L 15/08 |
| 2020/0349927 A1 * | 11/2020 | Stoimenov | G10L 17/24 |
| 2020/0357387 A1 * | 11/2020 | Prabhavalkar | G06N 3/044 |
| 2020/0357388 A1 * | 11/2020 | Zhao | G06N 3/08 |
| 2021/0312905 A1 * | 10/2021 | Zhao | G10L 15/16 |
| 2021/0407498 A1 * | 12/2021 | Stoimenov | G06N 3/084 |
| 2022/0020495 A1 * | 1/2022 | Sadeghi | G06F 40/30 |
| 2022/0130374 A1 * | 4/2022 | Chen | G10L 15/16 |
| 2022/0319506 A1 * | 10/2022 | Heikinheimo | G10L 15/065 |
| 2023/0360646 A1 * | 11/2023 | Coucheiro Limeres | |
| | | | G10L 15/30 |
| 2024/0161732 A1 * | 5/2024 | Chen | G10L 15/07 |

FOREIGN PATENT DOCUMENTS

| | | | | |
|---|---|---|---|---|
| EP | 4068279 B1 * | 1/2024 | | G06N 3/04 |
| WO | WO-2014163857 A1 * | 10/2014 | | G06F 16/367 |
| WO | WO-2014197669 A1 * | 12/2014 | | G06F 40/143 |
| WO | WO-2020226767 A1 * | 11/2020 | | G10L 15/08 |
| WO | WO-2020226778 A1 * | 11/2020 | | G06N 3/044 |
| WO | WO-2021201999 A1 * | 10/2021 | | G06N 3/0445 |
| WO | WO-2023215105 A1 * | 11/2023 | | G06N 3/0455 |

OTHER PUBLICATIONS

"International Search Report and Written Opinion Issued in PCT Application No. PCT/US23/019009", Mailed Date: Jun. 26, 2023, 11 Pages.

* cited by examiner

END-TO-END AUTOMATIC SPEECH RECOGNITION SYSTEM FOR BOTH CONVERSATIONAL AND COMMAND-AND-CONTROL SPEECH

BACKGROUND OF THE DISCLOSURE

1. Field of the Disclosure

The present disclosure relates to systems and methods for automatic speech recognition, and relates more particularly to end-to-end automatic speech recognition system for both conversational and Command-and-Control speech.

2. Description of the Related Art

Traditional automatic speech recognizers (ASRs) handle an explicit Language Model (LM) that can be manipulated to incorporate arbitrary words or multi-words. In the case both conversational speech and command & control (C&C) speech are sought to be handled, one approach to minimize degradation of overall recognition performance involves utilizing two different ASRs which are run in parallel, one for the conversational speech and one for the C&C speech. However, this parallel approach increases complexity and requires additional logic for switching between the two ASR systems.

End-to-end (E2E) automatic speech recognizers (ASRs), in which the acoustic, pronunciation and language models are all contained in a single neural network model, have been proven to clearly outperform traditional or hybrid ASRs, especially when trained with large amounts of training data. However, since E2E ASRs are purely based on Deep Neural Networks (DNNs), it remains unclear how to efficiently adapt the E2E ASRs to properly handle newer sets of words or sequences of words, e.g., commands defined by the user in a command & control (C&C) scenario. Furthermore, in the case the ASR is tasked with handling both conversational speech and C&C speech, it is crucial that the ASR's ability to properly handle one type of speech is not reduced in favor of the other.

One implementation of E2E ASR involves the use of external LMs, thereby achieving customization advantages. However, external LMs have several disadvantages, including: i) requiring additional overhead in the recognition process; ii) being prone to influence the overall recognition (including conversational speech), which may result in degradation of recognition performance for the conversational speech; and iii) requirement to train the external LMs, which is not trivial.

Another implementation of the E2E ASR involves using an additional module for biasing (using a bias list) the recognition of a set of words or multi-words, but this type of implementation of the E2E ASR is not proven to be effective or designed for handling the combined conversational and C&C speech scenario. In order to handle a considerable amount of entries in the bias list, a word prefix mask is applied to restrict the number of prefixes that the ASR actually attends to at each moment of the transcription, i.e., the masking implements a predefined rule-based approach.

Therefore, there is a need for improved E2E ASR system and method to achieve robust ASR accuracy in the case of handling combined conversational and C&C speech scenario, without incurring the drawbacks of the conventional approaches.

SUMMARY OF THE DISCLOSURE

According to an example embodiment of the present disclosure, an E2E ASR system based on DNN architecture incorporates at least one additional module that is seamlessly integrated in the DNN architecture to enable robust recognition of both conventional speech and C&C speech, which additional module can handle an external list of word commands or multi-word commands that serves to boost recognition of the C&C speech, without disturbing the recognition of conversational speech.

According to an example embodiment of the present disclosure, the additional module(s) incorporated in the E2E ASR system is configured to handle arbitrarily-defined entries in the external list, without requiring the E2E ASR to be trained beforehand with the arbitrarily-defined entries, thus allowing broad flexibility and immediate usability. This advantageous flexibility is enabled i) in part because "token" units that the E2E ASR handles are at the sub-word level, so any word can be composed with such inventory, and ii) in part because the ASR is capable of producing a meaningful representation of any such sequence for its own usage in the transcription process.

As used in the present disclosure, a "token" (also known as a terminal symbol) is the part of a grammar that defines words or other entities that may be spoken. For speech recognition, a token is typically an orthographic entity of the language being recognized, but a token may be any string that the speech recognizer can convert to a phonetic representation.

According to an example embodiment of the present disclosure, the additional module(s) incorporated in the E2E ASR system enables accurate speech recognition in situations involving i) conversational speech (e.g., a dialogue or a monologue) generated by one or more users, and ii) verbal commands delivered by the one or more users to a virtual assistant amidst the ongoing conversational speech.

According to an example embodiment of the present disclosure, the additional module incorporated in the E2E ASR system is configured to handle arbitrarily-defined entries in the external list, which list can include names and C&C words.

According to an example embodiment of the present disclosure, the E2E ASR system is configured using the Neural Transducer (NT) architecture.

According to an example embodiment of the present disclosure, the E2E ASR system is configured using the Listen, Attend, and Spell (LAS)-type architecture.

According to an example embodiment of the present disclosure, the additional module(s) incorporated in the E2E ASR system can include a bias encoder, a label encoder, a first attention mechanism, a second attention mechanism, and an additional attention mechanism.

According to an example embodiment of the present disclosure, prefix penalties are provided for restricting the first attention mechanism to only those entries that fit the current transcription context.

According to an example embodiment of the present disclosure, the prefix penalties are provided by the label encoder and the second attention mechanism.

DETAILED DESCRIPTION

Figure 1:
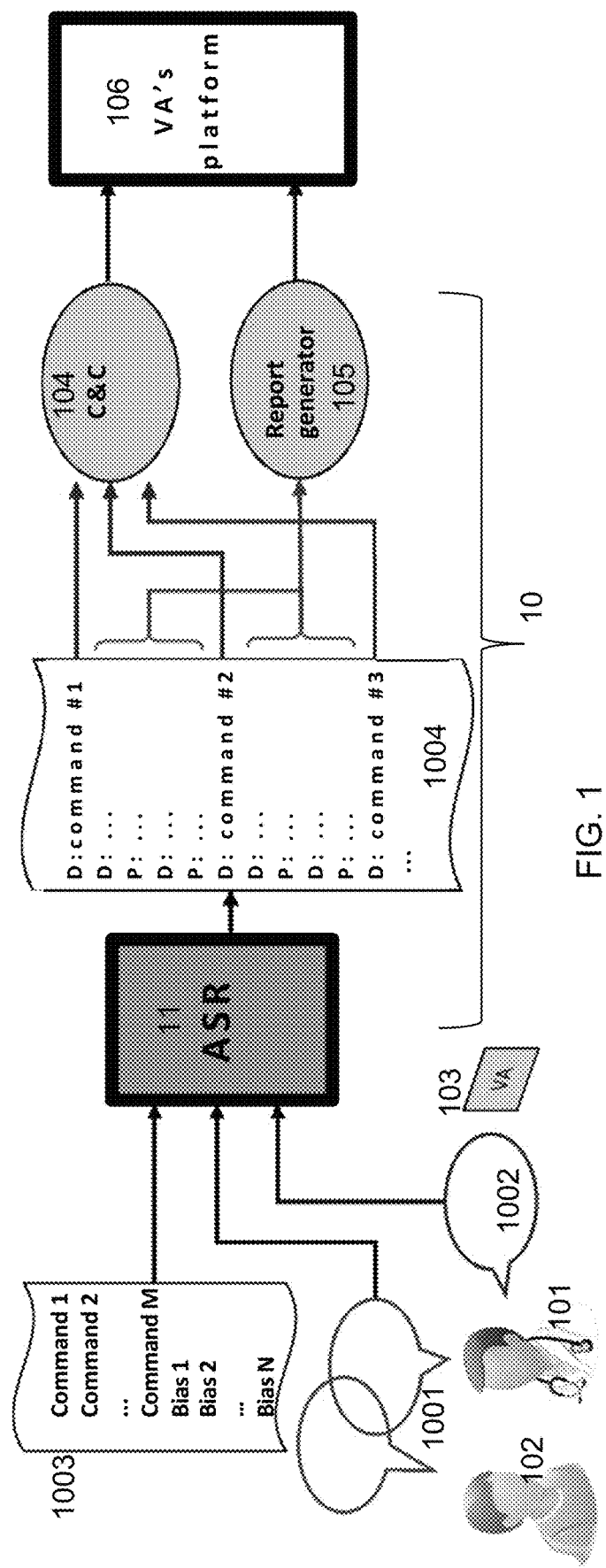
FIG. 1 illustrates a high-level architecture of an example embodiment of an E2E ASR system.

FIG. 1 illustrates a high-level architecture of an example embodiment of an E2E ASR system according to the present disclosure. As shown in FIG. 1, the E2E ASR system 10 has an ASR module 11 which is enabled to transcribe any speech occurring in the example scenario, e.g., a medical consultation between a doctor 101 and a patient 102. As shown in FIG. 1, a Virtual Assistant (VA) 103 is configured to assist a doctor 101, e.g., allowing the doctor 101 to perform verbal commands to the VA 103 and generate and/or manage relevant medical report(s) based on the doctor-patient encounter by automatically transcribing any speech occurring during the doctor-patient encounter. Speech occurring during the doctor-patient encounter can include the doctor-patient conversation 1001, a dictation part 1002 from the doctor (e.g., intended to provide more technical information for the subsequent medical report), and any command 1003 that the doctor 101 wants to execute (e.g., making corrections or specifying some specific part of a doctor-patient medical encounter report the doctor wants to fill in). As noted earlier, these commands 1003 can be defined by the doctor at will, which commands become immediately usable as they are incorporated in the command list to be handled by the ASR module 11.

The output of the example ASR module 11 will contain the transcription (output 1004 shown in FIG. 1) of the conversational speech occurring during the doctor-patient encounter (denoted as " . . . " next to "D" for doctor and "P" for patient in FIG. 1) as well as the commands uttered during the doctor-patient encounter. Since the overall set of commands is explicitly indicated as an additional input for the ASR module 11 (along with any other words that would be considered likely to boost recognition performance, e.g., the patient's name), any command found in the output transcription would be already marked automatically by the ASR module 11, as it is aware of the command(s). This marking could occur, for example, by the use of additional tokens that indicate the start and end of a command, thereby addressing any potential ambiguity that might arise involving words that also belong to normal conversational speech. In this manner, the ASR output 1004 can be generated and curated, e.g., in real-time, and the curated output portions can be fed to the subsequent system components, e.g., in an online fashion.

As shown in FIG. 1, the identified commands in the output 1004 are fed into the C&C module 104, and the conversational speech components of the doctor-patient encounter in the output 1004 are fed into the report generator module 105. In an example embodiment, the identified commands fed into the C&C module 104 can trigger an immediate responsive action in the VA's platform 106. In an example embodiment, the report generator module 105 can start the generation of the medical encounter report based on the conversational speech components of the doctor-patient encounter as the encounter ends (or, alternatively, start the encounter report as soon as the conversational speech components of the doctor-patient encounter in the output 1004 start to arrive the report generator module 105), and then transmit the generated medical encounter report to the VA's platform 106. After the encounter, the generated medical encounter report would be available in the VA's platform 106, thus fulfilling the doctor's verbal command to generate the medical encounter report.

Figure 2:
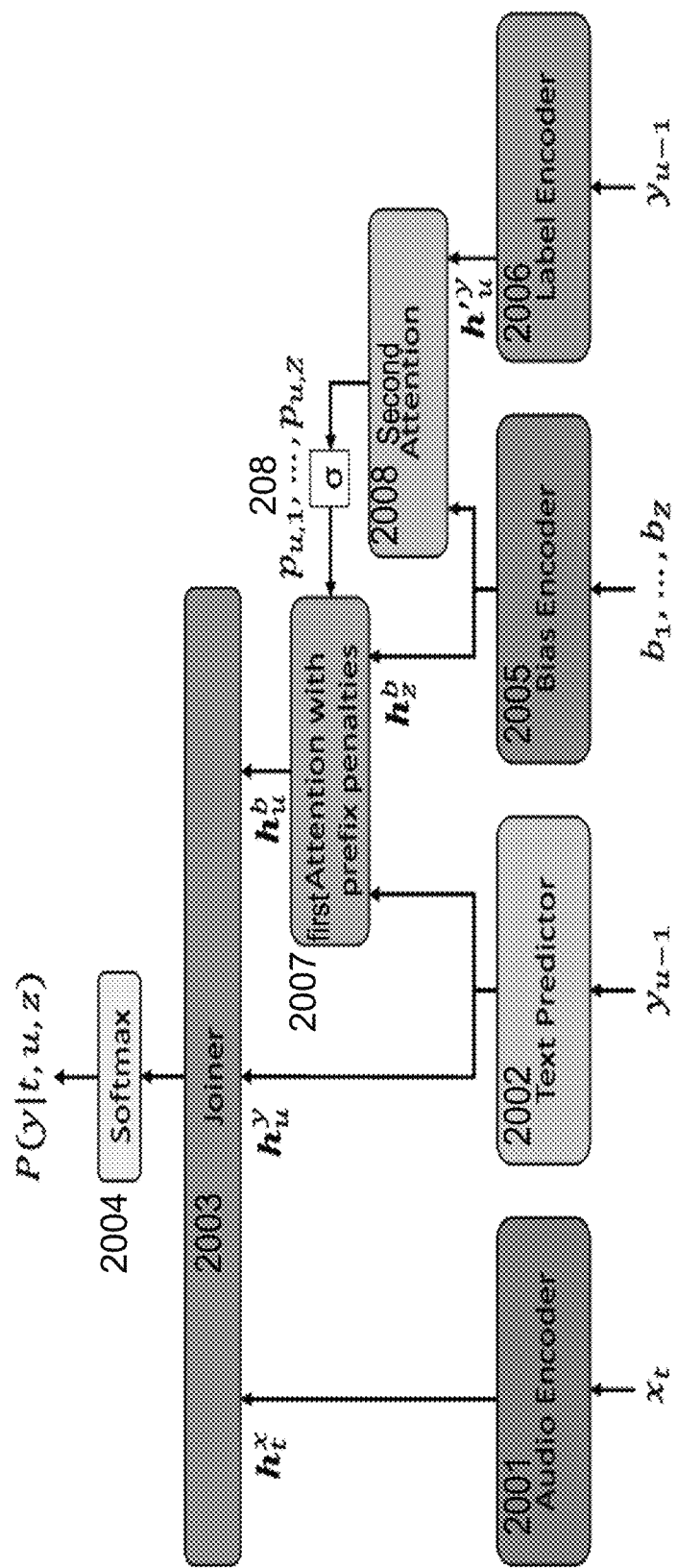
FIG. 2 illustrates various modules of an example embodiment of an end-to-end ASR system utilizing Neural Transducer (NT) architecture.

FIG. 2 illustrates various component modules of an example embodiment of an E2E ASR system. The type of E2E ASR system illustrated in FIG. 2 belongs to the Neural Transducer (NT) architecture, in which there are typically three networks (modules): the audio encoder 2001, which is in charge of processing the speech signal; the text predictor 2002, which in charge of predicting the next token to be transcribed, regardless of the audio, as some sort of LM; and the joiner 2003, which is in charge of processing the outputs from the other two networks (audio encoder 2001 and the text predictor 2002), which processed outputs are passed through a Softmax function layer (module) 2004 to produce token probabilities (the joiner 2003 and the Softmax function layer 2004 can be grouped as belonging to a single network, which can be generally denoted as a transcription token probability prediction network). The Softmax function is a function that turns a vector of K real values (positive, negative, zero, or greater than one) into a vector of K real values that sum to 1, i.e., Softmax transforms the input values into output values between 0 and 1, so that they can be interpreted as probabilities. In addition to the above-noted three networks, the proposed system incorporates two additional networks (modules), bias encoder 2005 and label encoder 2006, plus two attention mechanisms (first attention mechanism 2007 and second attention mechanism 2008).

It should be noted that in NT models there are two different sequence indexes, t and u. The first index, t, refers to the audio speech signal, i.e., t could be referring to each of the speech frames. The second index, u, refers to the output token sequence, which includes the sub-words that constitute the transcription. Therefore, the joiner 2003 and the Softmax function layer 2004 are operating at both t and u dimensions when determining the ASR solution. The other variables shown in FIG. 2 are defined as follows:

- x refers to the audio speech frames (whose sequence index is t) that serve as input to the E2E system;
- y refers to the transcription tokens (whose sequence index is u) that the E2E system has to predict;
- b refers to the bias entries (indexed by z); and
- Z refers to the total number of bias entries in the bias list.
- h refers to the hidden output of a module (the superscript associated with h refers to the type of information it is carrying (x for audio, y for transcription and b for bias entries); the subscript associated with h refers to sequence indexing it operates on (t for speech frames, u for transcription tokens and z for bias entries identifiers); and a prime (') would be used to distinguish between two h's with the same superscript and subscript).
- p refers to the prefix penalties, which are generated at each u step for each of the Z bias entries.
- P(X) refers to the probability of an event X.

The first additional module, the bias encoder 2005, is in charge of providing embeddings, i.e., distributed vector representations, for each entry in the bias list, which can include the C&C commands and other desired words to bias for recognition. The bias encoder 2005 can be implemented with, e.g., a recurrent network such as Long-Short-Term Memory Recurrent Neural Network (LSTM RNN). In order to determine which, if any, of the bias entries is suitable to be transcribed at each moment, the first attention mechanism 2007 is employed. In this first attention mechanism 2007, operated based on queries (Q), keys (K), values (V) and prefix penalties, the Q would be taken from the last output of the text predictor 2002, while both K and V would be the embeddings generated by the bias encoder 2005. The prefix penalties are a way of preventing attention to certain K and/or V, as will be explained below. The resulting output of the first attention mechanism 2007 is concatenated with the output of the text predictor 2002, so the joiner 2003 and the Softmax function layer 2004 can function as in normal NTs.

Before proceeding further, a brief explanation of Q, K and V is provided here. In an attention mechanism, we have a sequence of values (conforming V), e.g., [v1, v2, v3, v4, v5], from which we would like to take a weighted sum of its elements dependent on a certain query Q. Such a query would be evaluated over a mirrored version of the sequence V, named sequence K (in this example [k1, k2, k3, k4, k5]), in order to obtain the weights for each element in sequence V for the above-mentioned weighted sum. An example case is presented below:

A) V can be the acoustic realizations of words sought to be transcribed with an ASR system, e.g.: [hello_audio, my_audio, name_audio, is_audio, Alex_audio].

B) Although Q will be changing at every decoding step, for the sake of simplicity let's focus on the step in which the ASR system hypothesizes that the next word to transcribe might be "name", so the focus should be on that part of the audio (i.e., the attention mechanism would indicate which part of the audio to focus on), and then subsequent modules would be in charge of verification of the next word to transcribe (which is beyond the scope of the present explanation of Q, K and V)). Therefore, let's assume for this example that Q is name_hypothesis.

C) K can be the same as V (which is usually the case), but for illustrative purposes, let's assume K is a more orthographic representation of the words, not just acoustic as V, e.g.: [hello_ortho, my_ortho, name_ortho, is_ortho, Alex_ortho].

D) Then, we would perform some operation of Q against K, obtaining the similarity weights, e.g.: [0, 0, 1, 0, 0].

E) Finally the weighted sum of the elements in V would be: 0*hello_audio+0*my_audio+1*name_audio+ 0*is_audio+0*Alex_audio=name_audio.

F) In this manner, the attention mechanism would have provided the ASR system with the portion of the audio that actually corresponds to the "name" word part, which was the one the ASR system sought to focus on (or pay attention to).

G) The above-described operation represents the general scheme for an attention mechanism. In the ASR system according to the present disclosure, the attention mechanism is configured such that Q, K and V can be defined to enable focusing on specific parts of V depending on Q/K.

Figure 3:
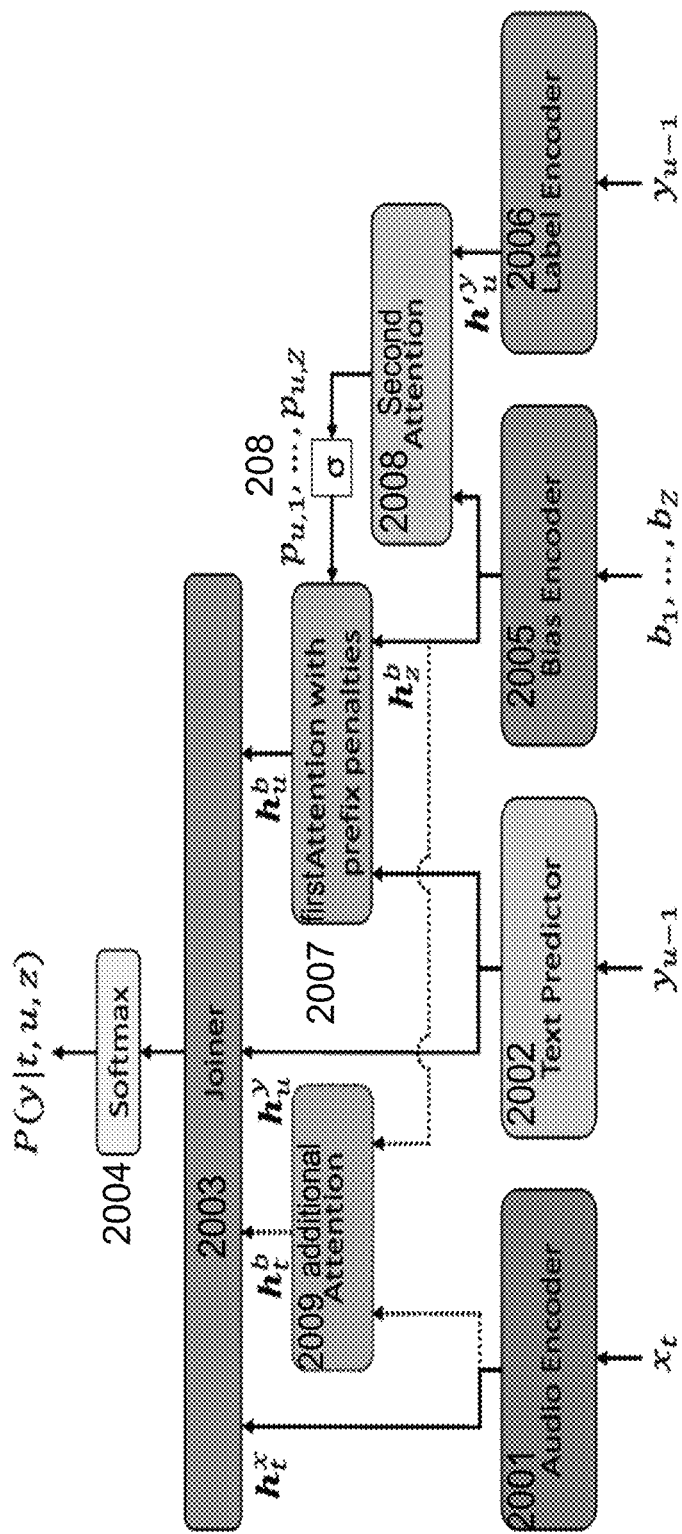
FIG. 3 illustrates various modules of another example embodiment of an E2E ASR system utilizing Neural Transducer (NT) architecture.

As an alternative to utilizing the last output of the text predictor 2002 as Q, the output from the audio encoder 2001 can be used as Q, in which case the output of the first attention mechanism 2007 is concatenated with the output of the audio encoder 2001, running in t domain, rather than in u. An additional alternative, which is shown in FIG. 3, is to provide an additional attention mechanism 2009, so that the output of the additional attention mechanism is concatenated with the output of the audio encoder 2001, and the output of the first attention mechanism 2007 is concatenated with the output of the text predictor 2002, thereby enabling both modes of operation, enriching both the audio encoder output and the text predictor output.

The previously mentioned prefix penalties are meant for restricting the first attention mechanism 2007 to only those entries that fit the current transcription context. For example, it may be desired to mask any non-fitting entry in the following scenario: the complete command is of the structure "go to field A", and the current transcription so far is " . . . go to field". In this scenario, it makes sense to only allow attention to commands like "go to field A" or "go to field B", the only ones that would fit the context. This masking is beneficial for ensuring robust recognition performance on lists with a large number of entries. Furthermore, it is also possible to extend the prefix penalties operation from only working intra-command (as previously exemplified) by adding two additional tokens to the lexicon, e.g., "<start_of_command>" and "<end_of_command>" to bookend any occurrence of a command in the training data. In this manner, the E2E ASR system can learn to predict when a command is going to be uttered and/or has been uttered. Until the token "<start_of_command>" is predicted, the E2E ASR system would produce prefix penalties to mask all the command entries, thereby preventing any attention to them in the first attention mechanism 2007, but subsequently enabling such attention once the token <start_of_command> occurs, which attention is enabled until the "<end_of_command>" token appears.

The label encoder 2006 and the second attention mechanism 2008 are configured to automatically produce the above-mentioned prefix penalties. The label encoder 2006 processes the output transcription tokens as a way of encoding the current state of the transcription, as exemplified before. The label encoder 2006 can be implemented with a LSTM RNN, for example. This encoded current state would then constitute the Q for the second attention mechanism 2008, while the K/V would be the embeddings of the entries in the command/bias list also used as K/V in the first attention mechanism 2007.

The resulting output of the second attention mechanism 2008 would then be gated by a sigmoid function module 208, to gain a clear binary notion of whether an entry is suitable or not at the specific moment of the ongoing transcription. During training of the example embodiment of the system according to the present disclosure, the ground-truth prefix penalties have to be provided, modifying the optimization criterion to also predict the ground-truth prefix penalties. During training, it is desired to have the ASR model produce prefix penalties that are exactly the same as the ground-truth prefix penalties (which are computed separately by reading the training data). If this training is successful, this means that, in inference time, the E2E ASR system can be relied upon to automatically produce proper prefix penalties for whichever transcription is being output, and there is no need to compute them separately.

The above-mentioned modification of the optimization criterion to predict the ground-truth prefix penalties can be achieved by adding an additional loss to the optimization criterion, accompanied by a weight to specify the relevance of such loss. This loss would consist of a cross-entropy between the ground-truth penalties and the predicted prefix penalties (after the sigmoid function module 208). The ground-truth penalties for the training data can be trivially computed by analyzing the input transcription and checking which bias entry fits at each sequence step (each step being a sub-word token of the transcription sequence, and the notion of fitting as exemplified above). This means that for each training utterance of length U (measured in sub-word tokens), and for a bias list of size Z, the ground-truth penalties would be a matrix of U×Z, with values of zeros/ones depending on whether a bias entry z fits/does not fit at the sequence step u.

The above-described, fully automated operation of the additional modules (bias encoder 2005, label encoder 2006, first attention mechanism 2007, second attention mechanism 2008, and additional attention mechanism 2009) enables the example embodiments of the E2E ASR system according to the present disclosure to achieve the dual objectives of i) normal functioning of the ASR system during inference, in the same manner a conventional E2E ASR system would operate, and ii) the extra capability of being able to input an arbitrary list of commands (C&C) and bias words to boost the ASR performance, with no additional modification to the system being required.

Figure 4:
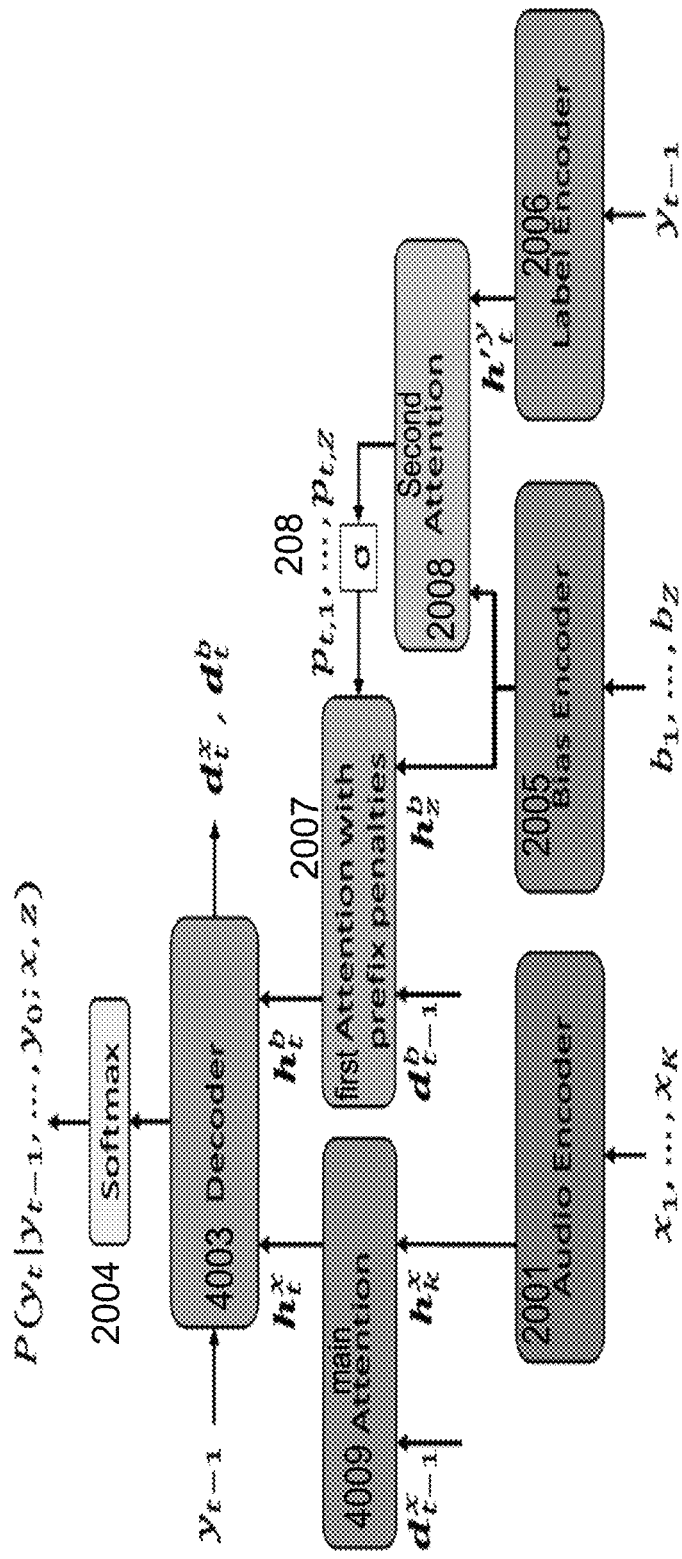
FIG. 4 illustrates various modules of an example embodiment of an E2E ASR system utilizing Listen, Attend, and Spell (LAS)-type architecture.

As an alternative to the NT architecture example embodiments shown in FIGS. 2 and 3, it should be noted that another type of architecture can be utilized for the E2E ASR system according to the present disclosure: the Listen, Attend, and Spell (LAS)-type architecture, an example embodiment of which is shown in FIG. 4. In the LAS-type architecture E2E ASR system shown in FIG. 4, the additional modules (i.e., the bias encoder 2005, the label encoder 2006, the first attention mechanism 2007, and the second attention mechanism 2008) interact with the "Spell" part (denoted in accordance with the industry convention as "decoder" 4003 in FIG. 4) of the LAS-type architecture.

In connection with FIG. 4, the LAS operation is initially described here without mentioning any of the bias modules. First, the audio is processed by the audio encoder 2001. Then, for each decoding step (which yields the next sub-word token, $y_t$, of the transcription), the decoder 4003 produces a context vector (denoted by variable d in the diagram, superscript x and subscript t) that will be used as the Q in the main attention mechanism 4009, and the output of the audio encoder 2001 ($h_k^x$ in FIG. 4) being used as the K/V. The result of the main attention mechanism 4009 ($h_t^x$ in FIG. 4) is then fed back to the decoder 4003, together with the previous sub-word token, $y_{t-1}$, to produce the next context vector as well as the output that predicts the next sub-word token, $y_t$, through the Softmax layer 2004 (in the embodiment shown in FIG. 4, the decoder 4003 and the Softmax layer 2004 constitute the transcription token probability prediction network).

Next, we describe the LAS operation with the bias modules shown in FIG. 4. The functioning of bias encoder 2005, label encoder 2006 and second attention mechanism 2008 (for prefix penalties generation) is the same as in the NT architecture described, e.g., in connection with FIG. 2. In FIG. 4, a different Q is used for the first attention with prefix penalties module 2007 in comparison to the embodiment of the NT architecture shown in FIG. 2. In the embodiment shown in FIG. 4, the Q used for the first attention with prefix penalties module 2007 is a context vector produced at each decoding step by the decoder 4003 (denoted by variable d in the diagram, superscript b and subscript t). As the notation indicates, this context vector is different than the one used in the main attention mechanism 4009.

Because the first attention with prefix penalties module 2007 (which acts as the LAS bias attention mechanism) in FIG. 4 uses a Q that was generated by the decoder 4003, which in turn receives input from the previous labels and the acoustic information, we can expect this Q to be richer than in the case of the NT architecture, e.g., as shown in FIG. 2, in which architecture the first attention with prefix penalties module 2007 made use of either the flow of information coming from the previous labels or from the acoustics (at most, both flows can be used in a split manner, each at a different bias attention mechanism, as shown in the embodiment of FIG. 3). In any case, for the NT architecture both flows (with or without biasing) are eventually joined in the joiner 2003, which (with the assistance of Softmax function layer 2004) is in charge of making the final decision about the next token to be transcribed.

In summary, an E2E ASR system according to the present disclosure incorporates at least one additional module that is seamlessly integrated in the DNN architecture to enable robust recognition of both conventional speech and C&C speech, which additional module provides the flexibility of being able to handle an external list of word commands or multi-word commands that serves to boost ASR performance with respect to the C&C speech, without disturbing the recognition of conversational speech.

The present disclosure provides a first example of a contextual end-to-end automatic speech recognition (ASR) system, which includes: an audio encoder configured to process input audio signal to produce as output encoded audio signal; a bias encoder configured to produce as output at least one bias entry corresponding to a word to bias for recognition by the ASR system, which bias entry can be a "blank" bias entry, if the recognition context does not fit to a "real word" bias entry; and a transcription token probability prediction network configured to produce as output a probability of a selected transcription token, based at least in part on the output of the bias encoder and the output of the audio encoder.

The present disclosure provides a second example system based on the above-discussed first example system, in which second example system the transcription token probability prediction network comprises a joiner module and a Softmax function layer.

The present disclosure provides a third example system based on the above-discussed first example system, in which third example system the transcription token probability prediction network comprises a decoder module and a Softmax function layer.

The present disclosure provides a fourth example system based on the above-discussed second example system, which fourth example system further includes a text predictor configured to produce as output a prediction of a next transcription token, based on a previous transcription token, wherein the output of the text predictor is supplied to the joiner module.

The present disclosure provides a fifth example system based on the above-discussed fourth example system, which fifth example system further includes a first attention mechanism configured to receive the at least one bias entry and determine whether the at least one bias entry is suitable to be transcribed at a specific moment of an ongoing transcription.

The present disclosure provides a sixth example system based on the above-discussed fifth example system, which sixth example system further includes a second attention mechanism configured to produce prefix penalties for restricting the first attention mechanism to only entries fitting a current transcription context.

The present disclosure provides a seventh example system based on the above-discussed sixth example system, which seventh example system further includes a label encoder configured to encode the current state of the transcription; wherein the second attention mechanism is configured to produce the prefix penalties at least in part based on the encoded current state of the transcription.

The present disclosure provides an eighth example system based on the above-discussed third example system, which eight example system further includes a first attention mechanism configured to receive the at least one bias entry and determine whether the at least one bias entry is suitable to be transcribed at a specific moment of an ongoing transcription.

The present disclosure provides a ninth example system based on the above-discussed eight example system, which ninth example system further includes a second attention mechanism configured to produce prefix penalties for restricting the first attention mechanism to only entries fitting a current transcription context.

The present disclosure provides a tenth example system based on the above-discussed ninth example system, which tenth example system further includes a label encoder configured to encode the current state of the transcription; wherein the second attention mechanism is configured to produce the prefix penalties at least in part based on the encoded current state of the transcription.

The present disclosure provides a first example method of operating a contextual end-to-end automatic speech recognition (ASR) system, which first example method includes: processing, by an audio encoder, an input audio signal to produce as output encoded audio signal; producing, by a bias encoder, as output at least one bias entry corresponding to a word to bias for recognition by the ASR system; and producing, by a transcription token probability prediction network, as output a probability of a selected transcription token, based at least in part on the output of the bias encoder and the output of the audio encoder.

The present disclosure provides a second example method based on the above-discussed first example method, in which second example method the transcription token probability prediction network comprises a joiner module and a Softmax function layer.

The present disclosure provides a third example method based on the above-discussed first example method, in which third example method the transcription token probability prediction network comprises a decoder module and a Softmax function layer.

The present disclosure provides a fourth example method based on the above-discussed second example method, which fourth example method further includes: producing, by a text predictor, as output a prediction of a next transcription token, based on a previous transcription token, wherein the output of the text predictor is supplied to the joiner module.

The present disclosure provides a fifth example method based on the above-discussed fourth example method, which fifth example method further includes: determining, by a first attention mechanism, whether the at least one bias entry output by the bias encoder is suitable to be transcribed at a specific moment of an ongoing transcription.

The present disclosure provides a sixth example method based on the above-discussed fifth example method, which sixth example method further includes: producing, by a second attention mechanism, prefix penalties for restricting the first attention mechanism to only entries fitting a current transcription context.

The present disclosure provides a seventh example method based on the above-discussed sixth example method, which seventh example method further includes: encoding, by a label encoder, the current state of the transcription; wherein the prefix penalties are produced by the second attention mechanism at least in part based on the encoded current state of the transcription.

The present disclosure provides an eight example method based on the above-discussed third example method, which eight example method further includes: determining, by a first attention mechanism, whether the at least one bias entry output by the bias encoder is suitable to be transcribed at a specific moment of an ongoing transcription.

The present disclosure provides a ninth example method based on the above-discussed eighth example method, which ninth example method further includes: producing, by a second attention mechanism, prefix penalties for restricting the first attention mechanism to only entries fitting a current transcription context.

The present disclosure provides a tenth example method based on the above-discussed ninth example method, which tenth example method further includes: encoding, by a label encoder, the current state of the transcription; wherein the prefix penalties are produced by the second attention mechanism at least in part based on the encoded current state of the transcription.

What is claimed is:

1. A contextual end-to-end automatic speech recognition (ASR) system, comprising:
   an audio encoder processing input audio signal to produce as output encoded audio signal;
   a bias encoder producing as output at least one bias entry corresponding to a word to bias for recognition by the ASR system; and
   a transcription token probability prediction network producing as output a probability of a selected transcription token, based at least in part on the output of the bias encoder and the output of the audio encoder.

2. The system according to claim 1, wherein the transcription token probability prediction network comprises a joiner module and a Softmax function layer.

3. The system according to claim 1, wherein the transcription token probability prediction network comprises a decoder module and a Softmax function layer.

4. The system according to claim 2, further comprising:
   a text predictor producing as output a prediction of a next transcription token, based on a previous transcription token, wherein the output of the text predictor is supplied to the joiner module.

5. The system according to claim 4, further comprising:
   a first attention mechanism receiving the at least one bias entry and determine whether the at least one bias entry is suitable to be transcribed at a specific moment of an ongoing transcription.

6. The system according to claim 5, further comprising:
   a second attention mechanism producing prefix penalties for restricting the first attention mechanism to only entries fitting a current transcription context.

7. The system according to claim 6, further comprising:
   a label encoder encoding a current state of a transcription; wherein the second attention mechanism produces the prefix penalties at least in part based on the encoded current state of the transcription.

8. The system according to claim 3, further comprising:
   a first attention mechanism receiving the at least one bias entry and determine whether the at least one bias entry is suitable to be transcribed at a specific moment of an ongoing transcription.

9. The system according to claim 8, further comprising:
   a second attention mechanism producing prefix penalties for restricting the first attention mechanism to only entries fitting a current transcription context.

10. The system according to claim 9, further comprising:
    a label encoder encoding a current state of a transcription configured to encode the current state of the transcription;

wherein the second attention mechanism produces the prefix penalties at least in part based on the encoded current state of the transcription.

11. A method of operating a contextual end-to-end automatic speech recognition (ASR) system, comprising:
   processing, by an audio encoder, an input audio signal to produce as output encoded audio signal;
   producing, by a bias encoder, as output at least one bias entry corresponding to a word to bias for recognition by the ASR system; and
   producing, by a transcription token probability prediction network, as output a probability of a selected transcription token, based at least in part on the output of the bias encoder and the output of the audio encoder.

12. The method according to claim 11, wherein the transcription token probability prediction network comprises a joiner module and a Softmax function layer.

13. The method according to claim 11, wherein the transcription token probability prediction network comprises a decoder module and a Softmax function layer.

14. The method according to claim 12, further comprising:
   producing, by a text predictor, as output a prediction of a next transcription token, based on a previous transcription token, wherein the output of the text predictor is supplied to the joiner module.

15. The method according to claim 14, further comprising:
   determining, by a first attention mechanism, whether the at least one bias entry output by the bias encoder is suitable to be transcribed at a specific moment of an ongoing transcription.

16. The method according to claim 15, further comprising:
   producing, by a second attention mechanism, prefix penalties for restricting the first attention mechanism to only entries fitting a current transcription context.

17. The method according to claim 16, further comprising:
   encoding, by a label encoder, a current state of a transcription;
   wherein the prefix penalties are produced by the second attention mechanism at least in part based on the encoded current state of the transcription.

18. The method according to claim 13, further comprising:
   determining, by a first attention mechanism, whether the at least one bias entry output by the bias encoder is suitable to be transcribed at a specific moment of an ongoing transcription.

19. The method according to claim 18, further comprising:
   producing, by a second attention mechanism, prefix penalties for restricting the first attention mechanism to only entries fitting a current transcription context.

20. The method according to claim 19, further comprising:
   encoding, by a label encoder, a current state of a transcription;
   wherein the prefix penalties are produced by the second attention mechanism at least in part based on the encoded current state of the transcription.

* * * * *